US012595004B2

(12) United States Patent
Venkitachalam et al.

(10) Patent No.: US 12,595,004 B2
(45) Date of Patent: Apr. 7, 2026

(54) FRONT SPOILER ARRANGEMENT FOR A MOTOR VEHICLE, IN PARTICULAR FOR A TRUCK

(71) Applicant: Volvo Truck Corporation, Gothenburg (SE)

(72) Inventors: Muthukumar Venkitachalam, Kerala (IN); Aniroop Kelothum Kandy, Kerala (IN); Rifat Fahmida Ali, West Bengal (IN)

(73) Assignee: Volvo Truck Corporation, Gothenburg (SE)

( * ) Notice: Subject to any disclaimer, the term of this patent is extended or adjusted under 35 U.S.C. 154(b) by 60 days.

(21) Appl. No.: 18/643,430

(22) Filed: Apr. 23, 2024

(65) Prior Publication Data

US 2024/0417005 A1 Dec. 19, 2024

(30) Foreign Application Priority Data

Jun. 16, 2023 (EP) ..................................... 23179677

(51) Int. Cl.
B62D 35/00 (2006.01)
G06V 20/58 (2022.01)
(52) U.S. Cl.
CPC ........... B62D 35/005 (2013.01); G06V 20/58 (2022.01); B62D 35/001 (2013.01)
(58) Field of Classification Search
None
See application file for complete search history.

(56) References Cited

U.S. PATENT DOCUMENTS

| | | | | | |
|---|---|---|---|---|---|
| 4,119,339 | A | * | 10/1978 | Heimburger | B62D 35/005 |
| | | | | | 296/180.5 |
| 4,131,308 | A | * | 12/1978 | Holka | B62D 35/005 |
| | | | | | 296/180.5 |
| 4,683,974 | A | * | 8/1987 | Richardson | B62D 35/005 |
| | | | | | 296/180.1 |
| 6,079,769 | A | * | 6/2000 | Fannin | B62D 35/001 |
| | | | | | 296/180.1 |
| 8,887,845 | B2 | | 11/2014 | McDonald et al. | |

(Continued)

FOREIGN PATENT DOCUMENTS

EP 1541452 A1 6/2005

OTHER PUBLICATIONS

Extended European Search Report for European Patent Application No. 23179677.2, mailed Dec. 13, 2023, 8 pages.

*Primary Examiner* — Daniel L Greene
(74) *Attorney, Agent, or Firm* — Withrow & Terranova, PLLC

(57) ABSTRACT

A front spoiler for a motor vehicle, comprising a central part and lateral curved parts configured to extend laterally from the central part to a front wheel arch of a vehicle, an extension configured to extend along a lower edge of the front spoiler towards a road surface, the extension comprising extension flaps fixed to the lower edge of the front spoiler, such that each extension flap is moveable between an extended position in which the extension flap is lowered into proximity with a road surface and a retracted position in which the extension flap is raised above the road surface, wherein one of the extension flaps extends along a lower edge of each lateral curved part of the front spoiler.

16 Claims, 5 Drawing Sheets

(56)     References Cited

U.S. PATENT DOCUMENTS

2010/0052361 A1*    3/2010   Tortosa-Boonacker .....................
                                                    B62D 35/005
                                                    296/180.1
2010/0140976 A1*    6/2010   Browne ............... B62D 35/005
                                                    296/180.1
2012/0330513 A1    12/2012   Charnesky et al.
2014/0076645 A1*    3/2014   McDonald ........... B62D 35/005
                                                    296/180.5

* cited by examiner

FRONT SPOILER ARRANGEMENT FOR A MOTOR VEHICLE, IN PARTICULAR FOR A TRUCK

PRIORITY APPLICATIONS

The present application claims priority to European Patent Application No. 23179677.2, filed on Jun. 16, 2023, and entitled "FRONT SPOILER ARRANGEMENT FOR A MOTOR VEHICLE, IN PARTICULAR FOR A TRUCK," which is incorporated herein by reference in its entirety.

TECHNICAL FIELD

The present disclosure relates generally to the field of front spoiler or bump arrangements for motor vehicles. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Such front spoiler arrangements are widely used to improve the aerodynamic properties of the motor vehicle body, in particular when driving in a comparatively high speed range. Thus, by means of a front spoiler which typically projects downward from a front apron of the motor vehicle, a certain dynamic pressure can be built up, which leads to inflowing air flowing to a far lesser extent under the vehicle but rather being guided laterally past or over the motor vehicle. As a result, the air resistance (aerodynamic drag) of the motor vehicle can be reduced and thus the energy consumption of the vehicle can be reduced.

A way to improve the aerodynamic properties of motor vehicles is to use a front spoiler that projects as far downward as possible toward the roadway. However, the ground clearance of the front spoiler of the motor vehicle must not be excessively limited as it can lead to damage to the spoiler, in particular when climbing a ramp and when driving over obstacles, such as, for example, road bumps in low traffic areas and curbstones.

Front spoilers of truck are generally large with a curved shape, and thus relatively costly. Some prior art approaches propose to add a retractable extension beneath the front spoiler. Such a retractable extension tilts between an extended position in which the extension is lowered into proximity with the road surface and a retracted position in which the extension is raised above the road. At lower speeds when the front spoiler is relatively ineffective, the front spoiler extension remains in the retracted position so as to eliminate inadvertent contact with roadway obstacles. At higher speeds on flat roads without obstacle, the front spoiler extension is lowered to its extended position to reduce aerodynamic drag of the vehicle. In addition, when the front spoiler extension hits an obstacle, the spoiler made of hard plastic does not undergo stress. Moreover, the extension can be easily replaced in contrast with the complete front spoiler.

Some prior art extensions are rigidly fixed to the front spoiler using rivets. When the extension is damaged due to an impact, the front spoiler is also damaged due to rivet failure. As a result the complete spoiler needs to be changed.

Thus, there is a need for a front spoiler that improves the aerodynamic properties of a vehicle and that can be easily repaired without involving expensive operations.

SUMMARY

An aspect of the disclosure relates to a front spoiler for a motor vehicle, comprising: a central part and lateral curved parts configured to extend laterally from the central part to a front wheel arch of a vehicle, an extension configured to extend along a lower edge of the front spoiler towards a road surface, the extension comprising extension flaps fixed to the lower edge of the front spoiler, such that each extension flap is moveable between an extended position in which the extension flap is lowered into proximity with a road surface and a retracted position in which the extension flap is raised above the road surface, wherein one of the extension flaps extends along a lower edge of each lateral curved part of the front spoiler.

As a technical benefit, the curved shape of the spoiler and the extension flaps reduce air that can flow through the bottom of the vehicle, thus leading to higher aerodynamic efficiency. In addition, when the extension is damaged, only the damaged extension flap need to be replaced, thus lowering repairing costs of the vehicle.

Optionally in some examples, one of the extension flaps comprises a lateral edge area that overlaps a lateral edge area of a lateral extension flap of the extension.

A technical benefit may include improving the structural rigidity of the extension as preventing deflection of the extension flap due to high relative wind speeds when the vehicle is in motion. The overlapping of the extension flaps also prevents any air leakage, thus avoiding additional aerodynamic drag.

Optionally in some examples, the extension comprises at least a central flap, two first lateral flaps which are adjacent to lateral edges of the central flap, and two second lateral flaps which are adjacent to lateral edges of the first lateral flaps.

As a technical benefit, when the extension meets a small obstacle, only a small part of the extension formed by one extension flap is moved to the retracted position and risks to be damaged.

Optionally in some examples, each extension flap is fixed to the spoiler by means of at least two hinges, a spring being provided to apply to the extension flap a restoring force urging the extension flap in the extended position.

Thus, each of the extension flaps can be automatically set in its retracted position when it hit an obstacle and return to its extended position when the obstacle is passed.

Optionally in some examples, wherein the hinges fixing one of the extension flaps to the spoiler are linked together by a spring.

In this manner, when one of the hinges of one flap is actuated in one direction the other hinge is urged by the spring to rotate in a same direction. Thus the spring ensures equal load distribution between the two hinges fixing the extension flap, and helps reducing individual load and stress in the hinge area of the extension. Due to such a reduction in load and stress, there is less wear and tear leading to an increased hinge life and performance.

Optionally in some examples, one or more of the extension flaps comprises an inclined part extending towards the ground and a flat part disposed against a flat part of the spoiler in the extended position.

In this manner, the extension flap can be easily fixed to the spoiler S by fixing the hinges to an upper edge of the extension flap and to a lower edge of the spoiler. In addition, such a fixation of the extension flaps prevents the extension from being drawn forwards with regard to the vehicle longitudinal axis, for example when the vehicle moves back and the extension meets an obstacle.

Optionally in some examples, the front spoiler further comprises an actuator driving at least one of the extension flaps between its extended and retracted positions.

Optionally in some examples, each of the central part and the lateral parts of the front spoiler is formed by a separate panel.

Another aspect of the disclosure relates to a vehicle comprising a front spoiler as defined above.

According to an example, the vehicle further comprises: an actuator driving at least one of the extension flaps between its extended and retracted positions, a computer vision system configured to generate data related to obstacles in front of the vehicle, that may hit the extension, and a computing unit configured to analyze a space in front of the spoiler to detect an obstacle that can hit the extension flap, and control the actuator to move the extension flap towards its retracted position when an obstacle is detected and to set the extension flap in its extended position when no obstacle is detected.

Thus, the extension flap can be set in its retracted position before it hits an obstacle.

According to an example, the computing unit is further configured to control the actuator so as to move the extension flap between the extended position and the retracted position as a function of a longitudinal speed of the vehicle.

According to an example, the computing unit is further configured to control the actuator so as to move the extension flap in the raised position when the vehicle speed is lower than a first speed threshold, and to move the extension flap in the extended position when the vehicle speed is greater than a second speed threshold.

Embodiments may also relate to a computer implemented method comprising: analyzing, by a processing circuitry, a space in front of a front spoiler of a motor vehicle, the front spoiler being as defined above; and controlling, by the processing circuitry, an actuator to move one of the extension flaps towards its retracted position when an obstacle is detected and to set the extension flap in its extended position when no obstacle is detected.

According to an example, the method further comprises controlling, by the processing circuitry, the actuator so as to move the extension flap between the extended position and the retracted position as a function of a longitudinal speed of the vehicle.

According to an example, the method further comprises controlling, by the processing circuitry, the actuator so as to move the extension flap in the raised position when the vehicle speed is lower than a first speed threshold, and to move the extension flap in the extended position when the vehicle speed is greater than a second speed threshold.

Another aspect of the disclosure relates to a computer program product comprising program code for performing, when executed by the processing circuitry, the method as defined above.

Another aspect of the disclosure relates to a non-transitory computer-readable storage medium comprising instructions, which when executed by the processing circuitry, cause the processing circuitry to perform the method as defined above.

BRIEF DESCRIPTION OF THE DRAWINGS

The foregoing and other purposes, features, aspects and advantages of the invention will become apparent from the following detailed description of embodiments, given by way of illustration and not limitation, with reference to the accompanying drawings, in which the same reference refer to similar elements or to elements having similar functions, and in which.

DETAILED DESCRIPTION

Figure 1:
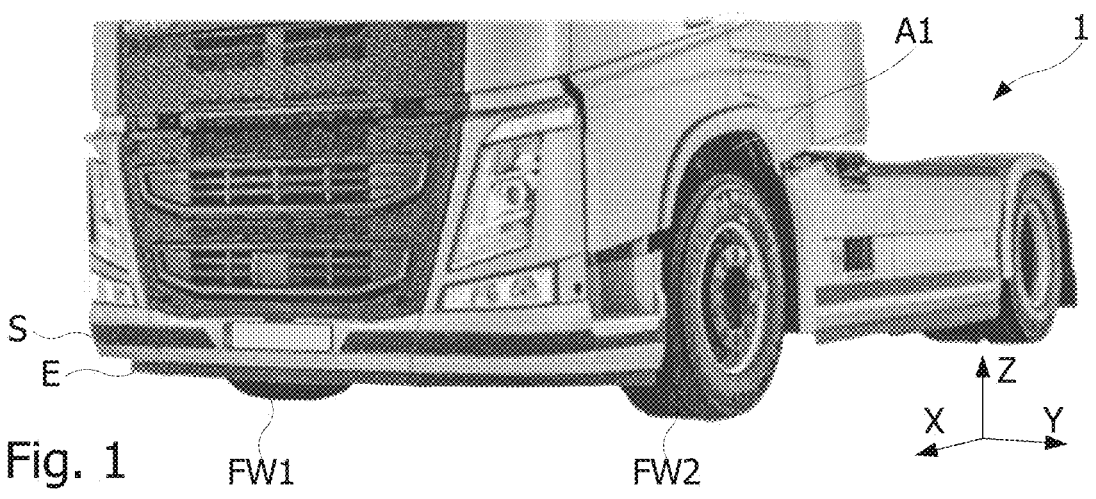
FIG. 1 is a schematic perspective view of a vehicle such as a truck fitted with a front spoiler, according to an example.

FIG. 1 shows a motor vehicle 1 fitted with a front spoiler S according to an example. The front spoiler S can combine functions of a spoiler and a bumper. The front spoiler S comprises a central part and lateral curved parts extending laterally from the central part to a front wheel arch of the vehicle. The front spoiler S further comprises an extension E that extends from a lower edge of the front spoiler S towards the ground. The front spoiler S with the extension E have a curved shape extending along the front edge of the vehicle between wheel arches of front wheels FW1, FW2.

Positions of elements of the vehicle are located with respect to a longitudinal axis X of the vehicle, a transversal axis Y of the vehicle and an axis Z perpendicular to the plane XY.

Figure 2:
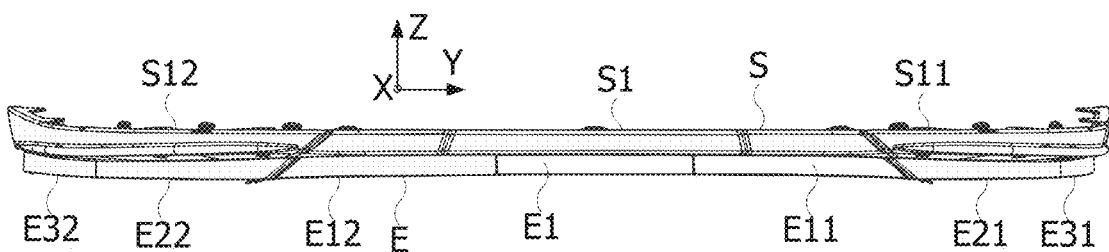
FIG. 2 is a schematic front view of the front spoiler, according to an example.
Figure 3:
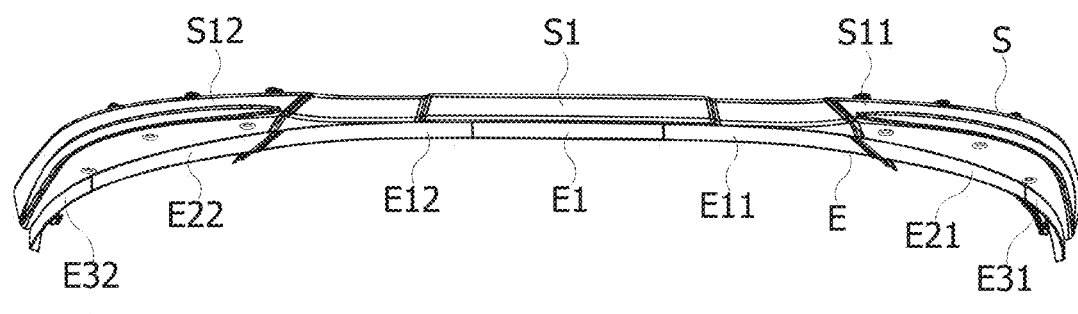
FIG. 3 is a schematic bottom perspective view of the front spoiler, according to an example.
Figure 4:
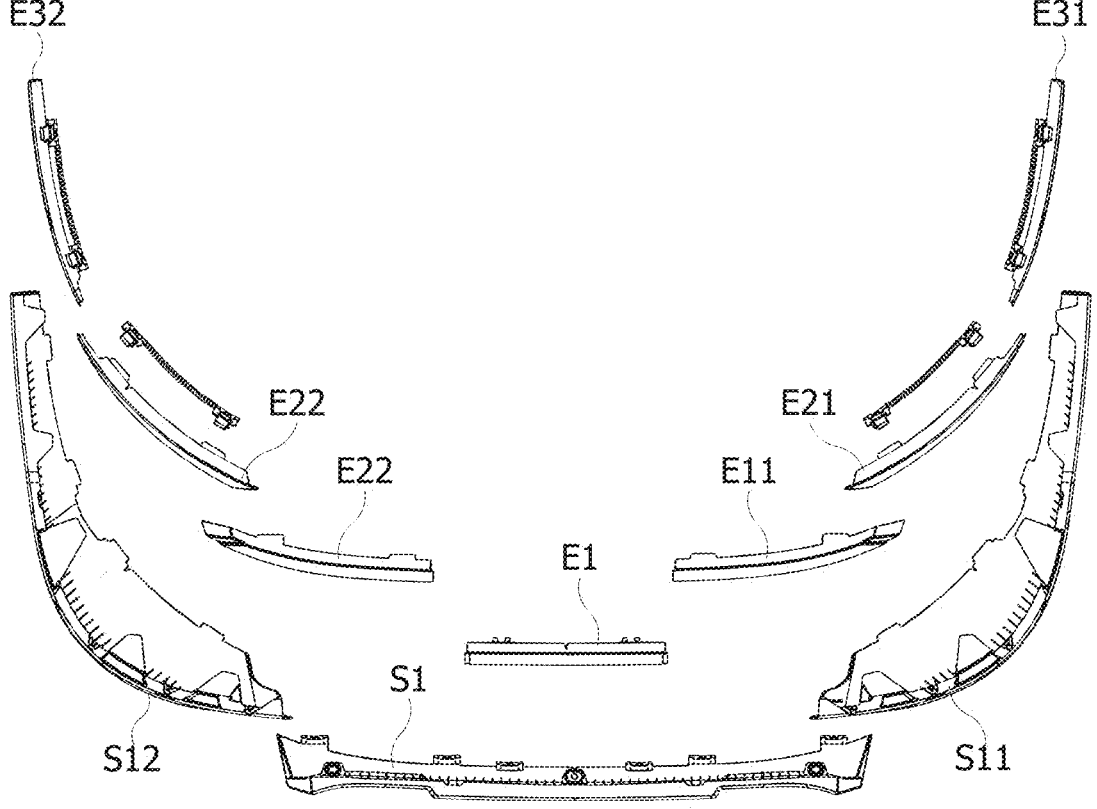
FIG. 4 is a schematic exploded top view of the front spoiler; according to an example.

FIGS. 2, 3 and 4 show the front spoiler S with the extension E, according to an example. The spoiler S comprises three separate panels, namely a central panel S1 and two lateral panels S11, S12 which are adjacent to lateral edges of the central panel S1. The extension E comprises separate flaps, namely a central flap E1, two lateral flaps E11, E12 which are adjacent to lateral edges of the central flap E1, and at least two lateral flaps E21, E22 which are adjacent to lateral edges of the flaps E11, E12. Thus when the spoiler S or the extension E is damaged, only the damaged spoiler panel or extension flap need to be replaced.

In the example of FIGS. 2, 3 and 4, the extension E comprises seven distinct flaps, namely a central flap E1, two lateral flaps E11, E12 which are adjacent to lateral edges of the central flap E1, two lateral flaps E21, E22 which are adjacent to lateral edges of the flaps E11, E12, and two lateral flaps E31, E32 which are adjacent to lateral edges of the flaps E21, E22. The extensions flaps E1, E11 and E12 are fixed to spoiler panel S1, extensions flaps E11, E21 and E31 are fixed to the lateral spoiler panel S11, and extensions flaps E12, E22 and E32 are fixed to the lateral spoiler panel S12.

Due to the curved shape of the spoiler S with the extension E, covering a large edge area of the front part of the vehicle between the front wheel arches, less air can flow through the bottom of the vehicle, thus leading to higher aerodynamic efficiency.

The spoiler S can be made of plastic or metal, and the extension E can be made of rubber.

Figure 5:
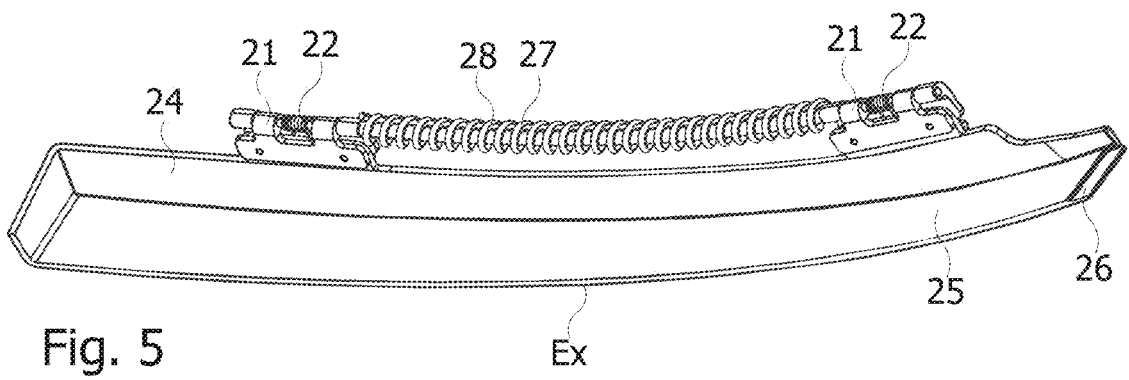
FIG. 5 is a schematic bottom perspective view of an extension part of the front spoiler, according to an example.
Figure 6:
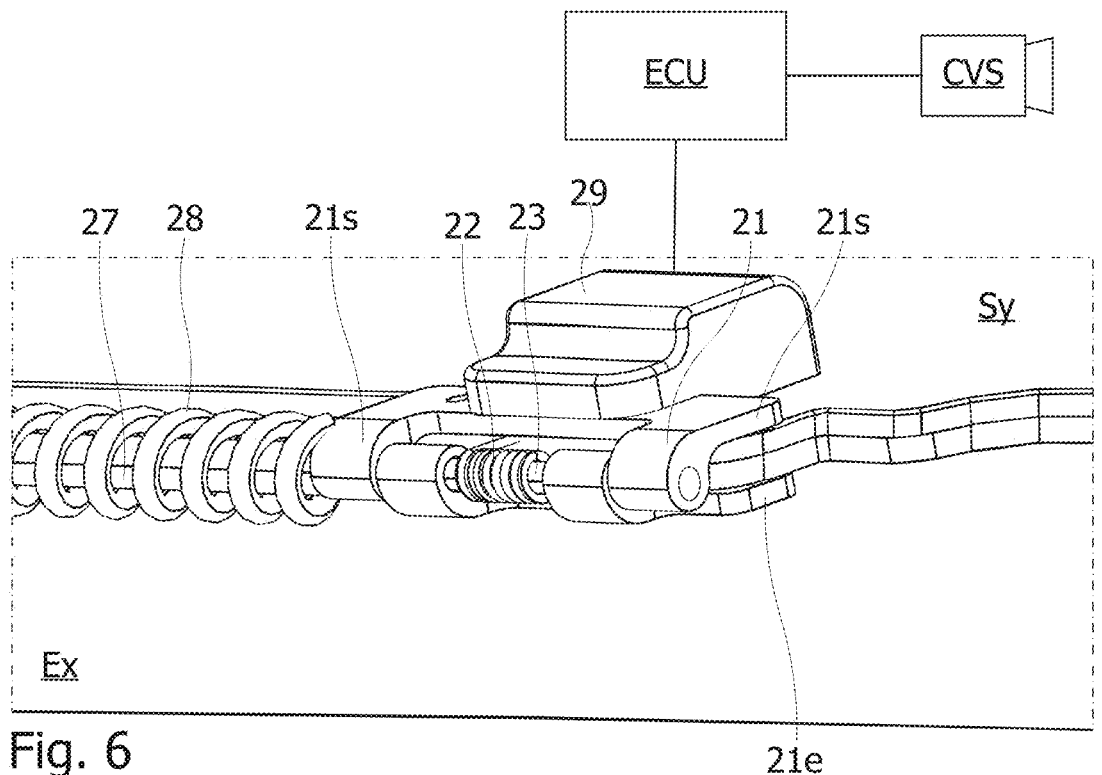
FIG. 6 is a schematic detailed lateral perspective view of the extension part, according to another example.

FIGS. 5 and 6 show one of the extension flaps Ex (E1, E11, E12, E21, E22, E31, E32). Each extension flap Ex is secured to a corresponding spoiler panel Sy (S1, S11, S12) by means of hinges 21 (two per extension flap). Each hinge 21 comprises one hinge element 21e secured to the extension flap Ex and one hinge element 21s secured to the corresponding spoiler panel Sy. The hinge elements 21e, 21s are rotatably fixed together by means of a hinge axis 23. The hinges 21 of the extension flap Ex make the extension flap movable between a retracted position and an extended position in which the extension flap is lowered into proximity with a road surface and a retracted position in which the extension flap is raised above the road surface rearwards with respect to the vehicle 1.

At least one of the hinges 21 of the extension flap Ex can be fitted with a spring 22 configured to urge the hinge 21 in one position corresponding to the extended position of the extension flap Ex with regard to the corresponding spoiler panel Sy. The spring 22 can be helical.

According to an example, one or more of the extension flaps Ex comprises an inclined part 25 extending towards the ground and a flat part 24 disposed against a flat part of the spoiler S in the extended position. In this manner, the extension flap can be easily fixed to the spoiler S by fixing the hinge parts 21e, 21s respectively to an upper edge of the extension flap Ex (i.e. an edge of the flat part 24) and to a lower edge of the spoiler S. In addition, such a fixation of the extension flaps Ex prevents the extension from being drawn forwards with regard to the vehicle longitudinal axis, for example when the vehicle moves back and the extension meets an obstacle. The flat part 24 can be substantially horizontal (parallel to plane XY).

In addition, the part 25 extending towards the ground can comprise a lateral overlapping edge part 26 that overlaps the adjacent extension flap, such that when the extension flap Ex is moved towards its retracted position, it drives the adjacent extension flap towards its retracted position against the restoring force exerted by springs 22. Thus, the overlapping part 26 improves the structural rigidity of the extension E as preventing deflection of the extension flap due to high relative wind speeds when the vehicle is in motion. The overlapping of the extension flaps Ex also prevents any air leakage, thus avoiding additional aerodynamic drag. According to an example, the central extension flap E1 has lateral edge areas that overlap an edge area respectively of the lateral extension flaps E11, E12 in a rearward direction with respect to the vehicle.

According to an example, the rotation axes 23 of the two hinges 21 securing the extension flap Ex to the spoiler panel Sy can be formed by a single rod 27 which can be curved to follow the curved shape of the upper edge of the extension flap Ex. A spring 28 extending around the rod 27 links the hinges 21 of the extension flap Ex such that when one of the hinges is actuated in one direction the other hinge is urged by the spring 28 to rotate in a same direction. Thus the spring 28 contributes to distribute the load between the two hinges 21 of the extension flap, and helps reducing individual load and stress in the hinge area of the extension Ex. Due to such a distribution in load and stress, there is less wear and tear leading to an increased hinge life and performance. The spring 28 can be helical. In this case, the rod 27 is provided to maintain the spring 28 along the extension flap Ex.

Figure 7A:
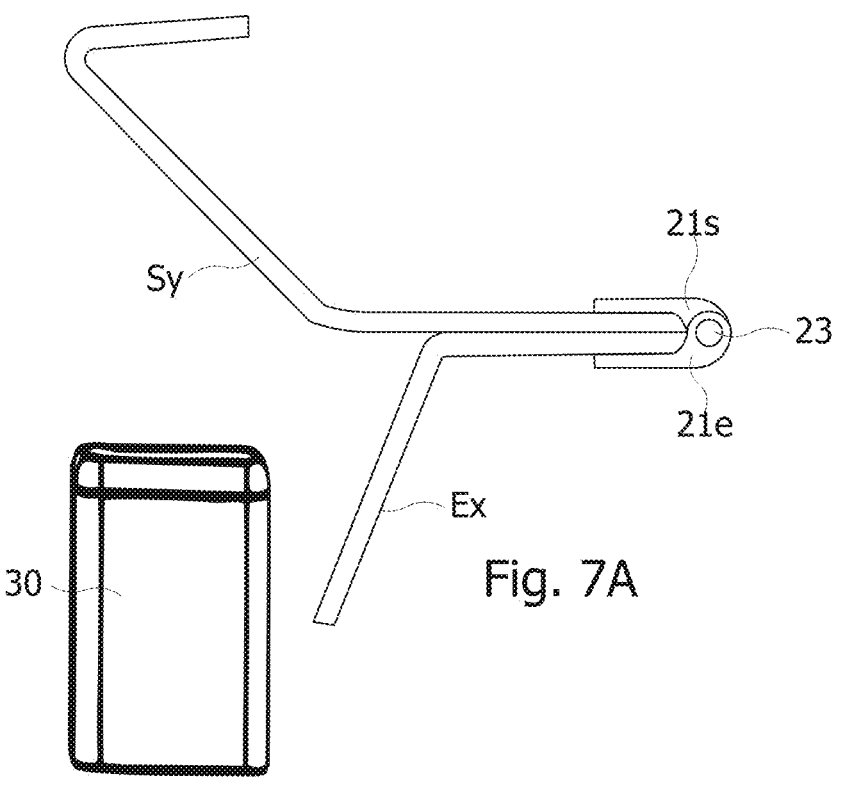
FIGS. 7A, 7B are schematic section of views of the front spoiler with an extension respectively in an extended position and in a retracted position, according to an example.
Figure 7B:
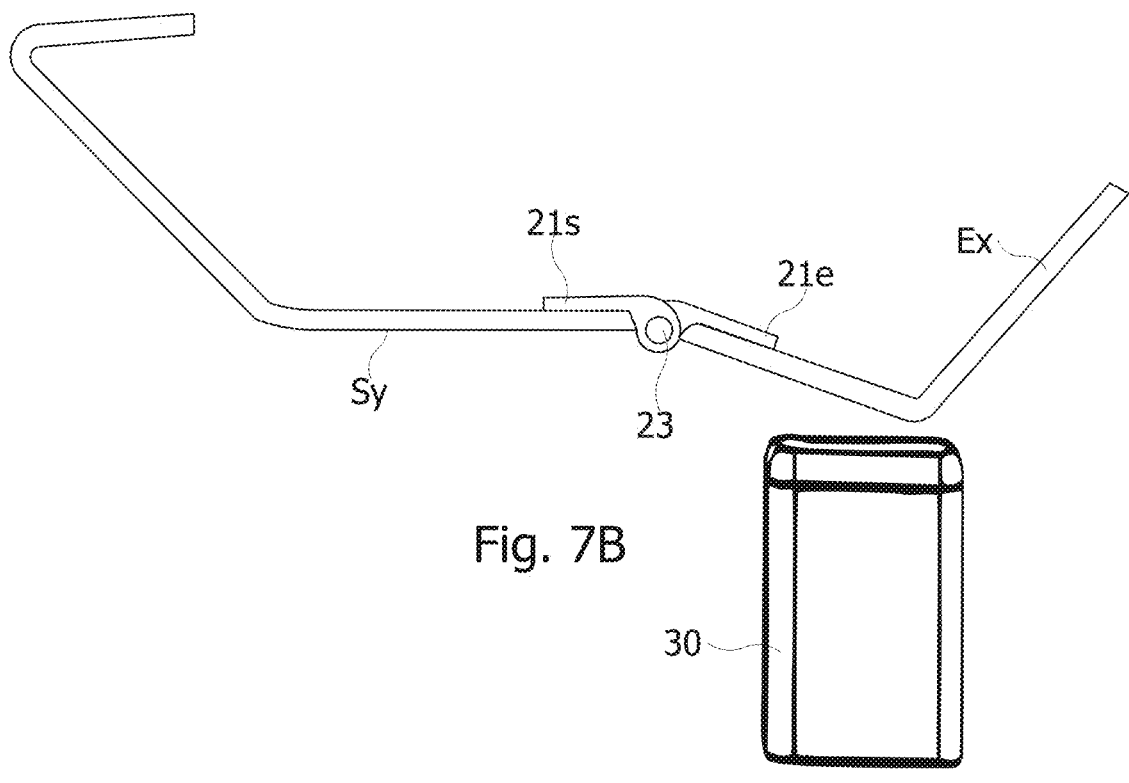

FIGS. 7A, 7B show a spoiler panel Sy, an extension flap Ex and hinge elements 21e, 21s, in the extended position (FIG. 7A) and in the retracted position (FIG. 7B), when an obstacle 30 that can hit the extension flap is present. As shown in FIG. 7B, the extension flap Ex can be completely retracted almost at a level of the lower edge of the front spoiler S to avoid the obstacle 30. In the extended position, the hinges 21 are angled at 0°. In the complete retracted position, the hinges 21 are angled between 5° to 180°.

According to an example, at least one of the hinges 21 of one or more of the extension flaps Ex is coupled with an actuator 29 (as shown in FIG. 6) controlling the rotation movements of the extension flap Ex between its extended and retracted positions. Each actuator 29 is controlled by a computing unit ECU configured to analyze the space in front of the spoiler S to detect obstacles and control the actuator 29 to move the corresponding extension flap Ex towards its retracted position when an obstacle 30 is detected in front of the extension flap. The computing unit ECU is further configured to move the extension flap Ex back to its extended position when no obstacle is detected. To this purpose, the computing unit ECU can be coupled with a vision system CVS, such as a camera, a radar or a LIDAR system, that observes the ground in front of the vehicle. The vision system CVS is configured to transmit to the computing unit ECU data related to obstacles in front of the vehicle, that may hit the extension E and possibly the spoiler S.

The actuator 29 can be compact so that it will not cause any hindrance to the surrounding parts of the spoiler S.

According to an example, the computing unit ECU can be configured to control the actuator 29 so as to move the extension flap Ex between the extended position and the retracted position as a function of a longitudinal speed of the vehicle 1, even in absence of obstacle in front of the vehicle. For example, the computing unit ECU can be configured to control the actuator 29 so as to move the extension flap Ex to the retracted position when the vehicle speed is lower than a first speed threshold, and to move the extension flap Ex to the extended position when the vehicle speed is greater than a second speed threshold that can be different from the first speed threshold.

Figure 8:
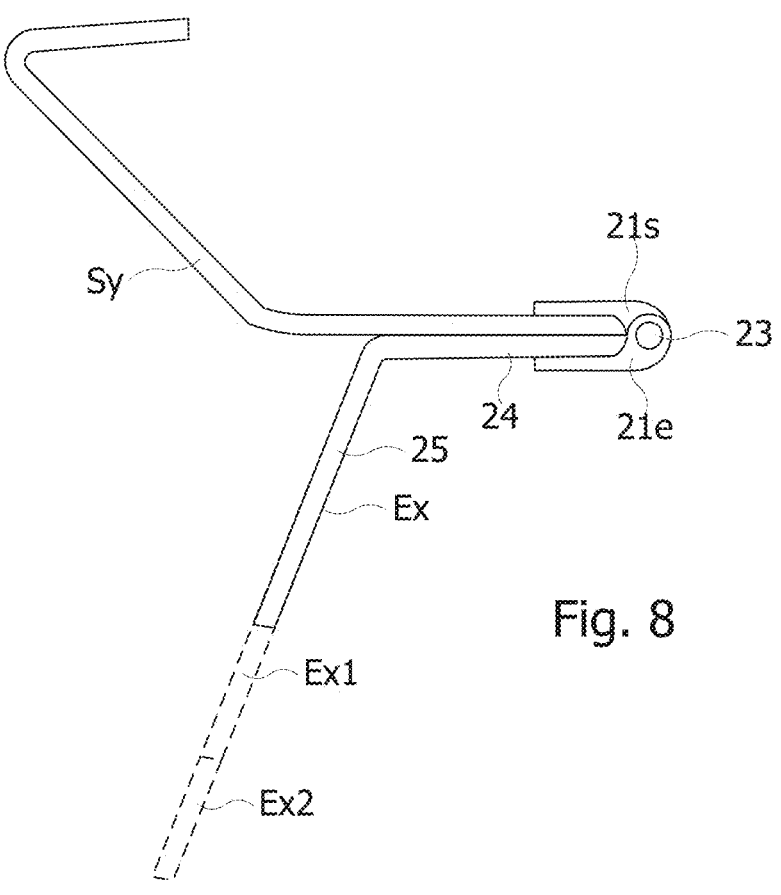
FIG. 8 is a schematic section of view of the front spoiler with extensions in the extended position of different heights, according to an example.

According to an example, a range of vehicles can be designed with same spoilers and different chassis heights. As shown in FIG. 8, a range of extensions Ex, Ex1, Ex2 with different heights (along Z axis) can be designed to be adapted to the heights of the chassis of the vehicle range so as to reduce the aerodynamic drag of each vehicle model of the vehicle range as far as possible. Thus the costs of the manufacturing tools can be reduced. In addition, some vehicles can be fitted with different wheel size, thus changing the chassis height of the vehicle. Moreover, the aerodynamic drag of the vehicle can be reduced merely by equipping the spoiler S with an extension E having an adapted height. In the example of FIG. 8, only the part 25 extending towards the ground of the extension flaps Ex is modified to have an expected length corresponding to the height of the chassis of the vehicle to be equipped.

Figure 9:
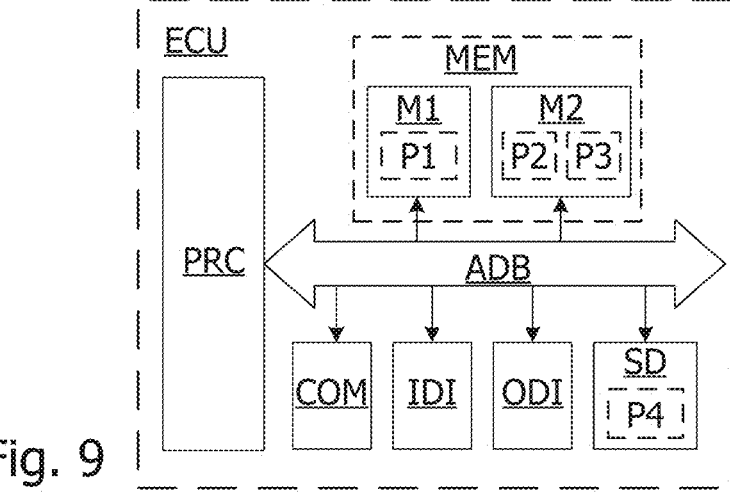
FIG. 9 is a schematic diagram of an exemplary computer system for implementing examples disclosed herein, according to an example.

FIG. 9 is a schematic diagram of the computing circuit ECU for implementing examples disclosed herein. The computing circuit ECU is adapted to execute instructions from a computer-readable medium to perform these and/or any of the functions or processing described herein. The computing circuit ECU may be connected (e.g., networked) to other machines in a LAN, an intranet, an extranet, or the Internet. While only a single device is illustrated, the computing circuit ECU may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit, processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computing circuit ECU may comprise at least one computing device or electronic device capable of including firmware, hardware, and/or executing software instructions to implement the functionality described herein. The computing circuit ECU may include processing circuitry PRC (e.g., processing circuitry including one or more processor devices or control units), a memory MEM, and a system bus ADB. The computing circuit ECU may include at least one computing device having the processing circuitry PRC. The system bus ADB provides an interface for system components including, but not limited to, the memory MEM and the processing circuitry PRC. The processing circuitry PRC may include any number of hardware components for conducting data or signal processing or for executing computer code stored in memory MEM. The processing circuitry PRC may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry PRC may further include computer executable code that controls operation of the programmable device.

The system bus ADB may be any of several types of bus structures that may further interconnect to a memory bus (with or without a memory controller), a peripheral bus, and/or a local bus using any of a variety of bus architectures. The memory MEM may be one or more devices for storing data and/or computer code for completing or facilitating methods described herein. The memory MEM may include database components, object code components, script components, or other types of information structure for supporting the various activities herein. Any distributed or local memory device may be utilized with the systems and methods of this description. The memory MEM may be communicably connected to the processing circuitry PRC (e.g., via a circuit or any other wired, wireless, or network connection) and may include computer code for executing one or more processes described herein. The memory MEM may include one or more non-volatile memories M1 (e.g., read-only memory (ROM), erasable programmable read-only memory (EPROM), electrically erasable programmable read-only memory (EEPROM), etc.), and volatile memory M2 (e.g., random-access memory (RAM)), or any other medium which can be used to carry or store desired program code in the form of machine-executable instructions or data structures and which can be accessed by a computer or other machine with processing circuitry PRC. A basic input/output system (BIOS) P1 may be stored in the non-volatile memory M1 and can include the basic routines that help to transfer information between elements within the computing circuit ECU.

The computing circuit ECU may further include or be coupled to a non-transitory computer-readable storage medium such as the storage device SD, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device SD and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device SD and/or in the volatile memory M2, which may include an operating system P2 and/or one or more program modules P3. All or a portion of the examples disclosed herein may be implemented as a computer program P4 stored on a transitory or non-transitory computer-usable or computer-readable storage medium (e.g., single medium or multiple media), such as the storage device SD, which includes complex programming instructions (e.g., complex computer-readable program code) to cause the processing circuitry PRC to carry out actions described herein. Thus, the computer-readable program code of the computer program P4 can comprise software instructions for implementing the functionality of the examples described herein when executed by the processing circuitry PRC. In some examples, the storage device SD may be a computer program product (e.g., readable storage medium) storing the computer program P4 thereon, where at least a portion of a computer program P4 may be loadable (e.g., into a processor) for implementing the functionality of the examples described herein when executed by the processing circuitry PRC. The processing circuitry PRC may serve as a controller or control system for the computing circuit ECU that is to implement the functionality described herein.

The computing circuit ECU may include an input device interface IDI configured to receive input and selections to be communicated to the computing circuit ECU when executing instructions, such as from a keyboard, mouse, touch-sensitive surface, etc. Such input devices may be connected to the processing circuitry PRC through the input device interface IDI coupled to the system bus ADB but can be connected through other interfaces, such as a parallel port, an Institute of Electrical and Electronic Engineers (IEEE) 1394 serial port, a Universal Serial Bus (USB) port, an IR interface, and the like. The computing circuit ECU may include an output device interface ODI configured to forward output, such as to a display, a video display unit (e.g., a liquid crystal display (LCD) or a cathode ray tube (CRT)). The computing circuit ECU may include a communications interface COM suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software.

Although a specific order of method actions may be shown or described, the order of the actions may differ. In addition, two or more actions may be performed concurrently or with partial concurrence.

A first example relates to a vehicle electronic system comprising a computing circuit ECU, the vehicle electronic system being installed in a vehicle 1, the computing circuit being configured to:

acquire data related to obstacle in a space in front of the vehicle by means of a computer vision system CVS;

store the acquired data in the buffer memory;

analyze the stored data to detect obstacles that may be hit by the extension;

control an actuator that moves an extension flap from an extended position towards a retracted position to prevent the extension flap from being hit by the obstacle; and control the actuator that moves an extension flap towards the extended position when no obstacles are detected that may hit the extension.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

Accordingly, while some alternatives or embodiments have been presented specifically, other embodiments will be apparent or easily developed by those of ordinary skills in the related art. In this respect, it is apparent to those of ordinary skills in the related art that the spoiler can be made of a single piece extending from the left front wheel arch to the right front wheel arch of the vehicle.

The invention claimed is:

1. A front spoiler for a motor vehicle, comprising:

a central part and lateral curved parts configured to extend laterally from the central part to a front wheel arch of a vehicle;

an extension configured to extend along a lower edge of the front spoiler towards a road surface, the extension comprising extension flaps fixed to the lower edge of the front spoiler, such that each extension flap is moveable between an extended position in which the extension flap is lowered into proximity with a road surface and a retracted position in which the extension flap is raised above the road surface;

wherein one of the extension flaps extends along a lower edge of each lateral curved part of the front spoiler and each extension flap is fixed to the spoiler by at least two hinges, a spring being provided to apply to the extension flap a restoring force urging the extension flap in the extended position.

2. The front spoiler of claim 1, wherein one of the extension flaps comprises a lateral edge area that overlaps a lateral edge area of a lateral extension flap of the extension.

3. The front spoiler of claim 1, wherein the extension comprises at least a central flap, two first lateral flaps which are adjacent to lateral edges of the central flap, and two second lateral flaps which are adjacent to lateral edges of the first lateral flaps.

4. The front spoiler of claim 1, further wherein the hinges fixing one of the extension flaps to the spoiler are linked together by a spring.

5. The front spoiler of claim 1, wherein one or more of the extension flaps comprises an inclined part extending towards the ground and a flat part disposed against a flat part of the spoiler in the extended position.

6. The front spoiler of claim 1, further comprising an actuator driving at least one of the extension flaps between its extended and retracted positions.

7. The front spoiler of claim 1, wherein each of the central part and the lateral parts of the front spoiler is formed by a separate panel.

8. A vehicle comprising the front spoiler of claim 1.

9. The vehicle of claim 8, further comprising:

an actuator driving at least one of the extension flaps between its extended and retracted positions;

a computer vision system configured to generate data related to obstacles in front of the vehicle, that may hit the extension; and a computing unit configured to analyze a space in front of the spoiler to detect an obstacle that can hit the extension flap, and control the actuator to move the extension flap towards its retracted position when an obstacle is detected and to set the extension flap in its extended position when no obstacle is detected.

10. The vehicle of claim 9, wherein the computing unit is further configured to control the actuator so as to move the extension flap between the extended position and the retracted position as a function of a longitudinal speed of the vehicle.

11. The vehicle of claim 10, wherein the computing unit is further configured to control the actuator so as to move the extension flap in the raised position when the vehicle speed is lower than a first speed threshold, and to move the extension flap in the extended position when the vehicle speed is greater than a second speed threshold.

12. A computer implemented method comprising:

analyzing, by a processing circuitry, a space in front of a front spoiler of a motor vehicle, the front spoiler being of claim 1; and controlling, by the processing circuitry, an actuator to move one of the extension flaps towards its retracted position when an obstacle is detected and to set the extension flap in its extended position when no obstacle is detected.

13. The method of claim 12, further comprising controlling, by the processing circuitry, the actuator so as to move the extension flap between the extended position and the retracted position as a function of a longitudinal speed of the vehicle.

14. The method of claim 13, further comprising controlling, by the processing circuitry, the actuator so as to move the extension flap in the raised position when the vehicle speed is lower than a first speed threshold, and to move the extension flap in the extended position when the vehicle speed is greater than a second speed threshold.

15. A computer program product comprising program code for performing, when executed by the processing circuitry, the method of claim 12.

16. A non-transitory computer-readable storage medium comprising instructions, which when executed by the processing circuitry, cause the processing circuitry to perform the method of claim 12.

* * * * *